(12) United States Patent
Nelson et al.

(10) Patent No.: US 10,914,809 B2
(45) Date of Patent: Feb. 9, 2021

(54) SUB-NYQUIST BROADBAND TIME-DELAYED PHASED ARRAY

(71) Applicant: The Aerospace Corporation, El Segundo, CA (US)

(72) Inventors: Robert H. Nelson, Glendale, CA (US); Thomas Justin Shaw, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 340 days.

(21) Appl. No.: 15/874,197

(22) Filed: Jan. 18, 2018

(65) Prior Publication Data
US 2019/0219657 A1 Jul. 18, 2019

(51) Int. Cl.
| | |
|---|---|
| G01S 5/04 | (2006.01) |
| G01S 3/48 | (2006.01) |
| G01S 3/50 | (2006.01) |
| G01S 3/46 | (2006.01) |

(52) U.S. Cl.
CPC ........ *G01S 3/48* (2013.01); *G01S 3/50* (2013.01); *G01S 3/46* (2013.01); *G01S 3/465* (2013.01)

(58) Field of Classification Search
CPC ..... G01S 3/48; G01S 3/50; G01S 3/46; G01S 3/465
USPC ................................. 342/417, 442
See application file for complete search history.

(56) References Cited

U.S. PATENT DOCUMENTS

| | | | | |
|---|---|---|---|---|
| 6,351,238 B1 * | 2/2002 | Kishigami | ................ | G01S 3/74 342/417 |
| 6,642,888 B2 * | 11/2003 | Kishigami | ................ | G01S 3/74 342/417 |
| 6,700,536 B1 * | 3/2004 | Wiegand | ................ | G01S 3/023 342/417 |
| 6,738,018 B2 * | 5/2004 | Phelan | ................ | G01S 3/74 342/157 |
| 6,836,245 B2 * | 12/2004 | Kishigami | ........... | G06K 9/0057 342/417 |
| 6,897,807 B2 * | 5/2005 | Kishigami | ................ | G01S 3/74 342/417 |
| 7,082,171 B1 * | 7/2006 | Johnson | ................ | H03D 7/00 375/260 |
| 7,379,515 B2 * | 5/2008 | Johnson | ................ | H03D 7/00 375/347 |
| 7,737,892 B2 * | 6/2010 | Richardson | ......... | G01S 13/5244 342/375 |
| 8,330,650 B2 * | 12/2012 | Goldman | ................ | G01S 13/42 342/160 |
| 8,629,807 B2 * | 1/2014 | Wood | ................ | G01S 7/03 342/372 |

(Continued)

OTHER PUBLICATIONS

Braun, K.F., "Electrical Oscillations and Wireless Telegraphy", Nobel Lecture, Dec. 11, 1909, pp. 226-245.

(Continued)

*Primary Examiner* — Chuong P Nguyen
(74) *Attorney, Agent, or Firm* — LeonardPatel PC

(57) ABSTRACT

An apparatus that includes a phased array configured to monitor a broad bandwidth with low rate ADC achieving sub-Nyquist rate sampling with 100 percent duty cycle. The phased array includes a plurality of phased array elements. Each of the phased array elements are inserted with a non-uniform true time delay to enable simultaneous measurement of an AOA and a frequency of an incident RF signal.

21 Claims, 5 Drawing Sheets

(56) References Cited

U.S. PATENT DOCUMENTS

| | | | | |
|---|---|---|---|---|
| 8,902,096 B2* | 12/2014 | Valley | ............... | H03M 1/12 |
| | | | | 341/137 |
| 9,989,633 B1* | 6/2018 | Pandey | ............... | G01S 3/32 |
| 10,095,262 B2* | 10/2018 | Valley | ............... | G06E 1/00 |
| 10,349,213 B2* | 7/2019 | Berger | ............ | H04W 56/0065 |
| 10,367,674 B2* | 7/2019 | Bolstad | ............ | H04L 27/265 |
| 2009/0103593 A1* | 4/2009 | Bergamo | ............ | H04B 1/707 |
| | | | | 375/146 |

OTHER PUBLICATIONS

Longbrake, M., "True Time-Delay Beamsteering for Radar", 2012 IEEE National Aerospace and Electronics Conference (NAECON), Dayton, OH, 2012, pp. 246-249.

* cited by examiner

400

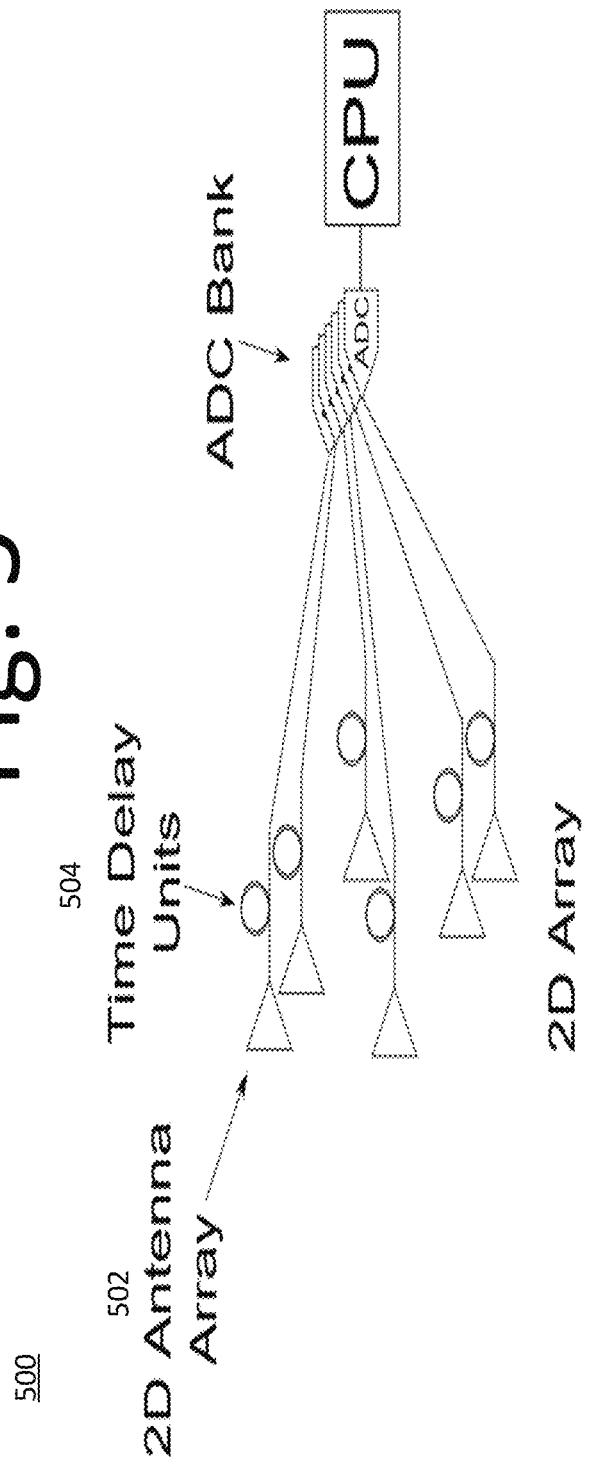

SUB-NYQUIST BROADBAND TIME-DELAYED PHASED ARRAY

FIELD

The present invention relates to a phased array, and more particularly, to a phased array for monitoring a broad bandwidth with low-rate analog to digital converters (ADC) achieving sub-Nyquist rate sampling.

BACKGROUND

Phased arrays are an array of antennas that allow for broadcast or transmission of radio frequency (RF) radiation or signals. By setting or measuring the phase, the direction of the signal can be selected or detected. This technology has been around for quite some time.

Since the area of interest is with respect to the receiver and not the transmitter, additional freedom to manipulate the phases that are to be measured can be realized. For this area, antenna elements are monitored with electronics that are of a certain bandwidth. This bandwidth may be significantly less than the bandwidth that the antenna can receive. For example, if each antenna element can receive signals with a radio frequency between 9.5 GHz and 10.5 GHz, then it is said to have 1 GHz of bandwidth. With this example, the monitoring electronics can only accept 100 MHz of bandwidth. Now, if the full range is to be scanned, then small increments of the bandwidth will be monitored, e.g., 9.5 to 9.6 GHz all the way up to 10.5 GHz.

Simply put, the incoming frequency in this example is measured by stepping through the bandwidth of interest in narrowband steps. With this technique, the duty cycle of each narrowband is limited by the number of steps. Thus, an alternative approach may be more beneficial.

SUMMARY

Certain embodiments of the present invention may provide solutions to the problems and needs in the art that have not yet been fully identified, appreciated, or solved by current phased array technologies. For example, some embodiments pertain to a phased array configured to monitor a broad bandwidth with low ADC achieving sub-Nyquist rate sampling with 100 percent duty cycle. In an embodiment, a non-uniform true time-delay is added to each phased-array antenna element, enabling the simultaneous measurement of angle-of-arrival (AOA) and frequency of incident RF energy.

In one embodiment, an apparatus includes a phased array that monitors a broad bandwidth with low rate analog to digital converters (ADC) achieving sub-Nyquist rate sampling with 100 percent duty cycle. The phase array includes a plurality of phased array elements, and each of the phased array elements are inserted with a non-uniform true time delay to produce a delayed signal for each of the phase array elements. Each delayed signal enables simultaneous measurement of an angle of arrival (AOA) signal and a frequency of an incident RF signal.

In another embodiment, a phased array for monitoring a broad bandwidth includes a plurality of low noise amplifiers configured to amplify a signal. The amplified signal from each of the plurality of low noise amplifiers are delayed by inserting a non-uniform true time delay. The insertion of the non-uniform true time delays within each amplified signal enables simultaneous measurement of AOA signal and a frequency of an incident RF signal.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a diagram illustrating a 2D wideband array, according to an embodiment of the present invention

DETAILED DESCRIPTION OF THE EMBODIMENTS

Some embodiments generally pertain to a phased array configured to monitor a broad bandwidth with low ADC achieving sub-Nyquist rate sampling with 100 percent duty cycle. A non-uniform true time delay is added to each phased array antenna element causing a pattern of phase differences to depend on the AOA and incident frequency. For example, a true time delay may be added in a manner that deconvolves frequency from the AOA. Although true time delay systems attempt to reduce the frequency dependence of a phase for each antenna element with respect to the AOA, the phased array described herein exploits the frequency dependence for a phased array receiver.

The instantaneous phase, $\varphi$, of an n-element phased array is given by $$\varphi = 2\pi \frac{L}{\lambda} \sin\theta_{AOA} \qquad (1)$$

For an incident, far-field wave with AOA, $\sin\theta_{AOA}$, L an n-element array of array spacings, and incident wavelength $\lambda$. In some embodiments, a fixed time delay is added to each element causing the phase to change by $$\phi = 2\pi\left(\frac{L}{\lambda}\sin\theta_{AOA} - f\tau\right) \qquad (2)$$

where f is the incident frequency and $\tau$ is an n-element vector of fixed time offsets. The first term in Equation 2 depends on the frequency and AOA, while the second term depends on frequency. Therefore, a non-degenerate choice of time delays may yield phases that decouple the frequency from the AOA.

Figure 1:
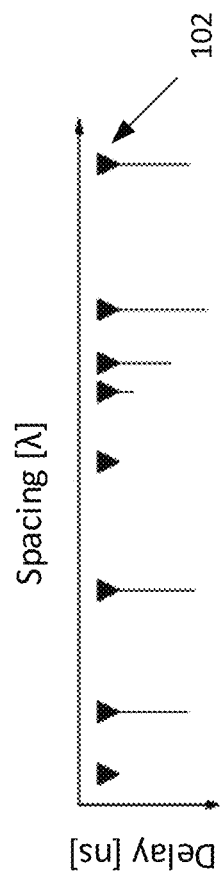
FIG. 1 illustrates a visualization of a linear phased array, according to an embodiment of the present invention.

FIG. 1 illustrates a visualization 100 of a linear phased array, according to an embodiment of the present invention. This embodiment may include an 8-element linear phased array with randomly chosen spacings and delays with a center frequency of 10 GHz and a bandwidth of 1.5 GHz. It should be appreciated that the embodiments are not limited to an 8-element linear phased array, and any number of elements may be envisioned in any configuration. It should further be appreciated that 10 GHz center frequency and 1.5 GHz bandwidth are for purposes of example only.

TABLE 1

| Element | 0 | 1 | 2 | 3 | 4 | 5 | 6 | 7 |
|---|---|---|---|---|---|---|---|---|
| Spacing [λ] | 0 | 1.115 | 3.292 | 5.586 | 6.855 | 7.354 | 8.310 | 10.913 |
| Time Delay [ns] | 0 | 7.00 | 7.63 | 0.31 | 2.30 | 5.52 | 8.64 | 7.10 |

Each line associated with phase elements 102 represents the delay. By adding a time delay to each phase element 102, a phase is created. In other words, each phase element 102 has a different time offset.

Although FIG. 1 illustrates a linear phased array, it should be appreciated that the embodiments are not limited to a linear phased array. Instead, other types of arrays may be used such as 2-dimensional (2D) arrays. For example, 2D arrays facilitate measurement AOAs in the x and y simultaneously with frequency. For example, FIG. 5 is a diagram illustrating a 2D wideband array 500, according to an embodiment of the present invention. In this embodiment, antenna array 502 is arranged spatially in a 2D plane with time delays added at time delay units 504 to allow for the simultaneous measurement of θx, θy, and frequency. If, for example, the spacing vector L is promoted to a matrix of spacings with the elements represented by rows and columns represented by the dimensions x and y, then an AOA vector A is defined as A=(sin θx, sin θy), and the phases in Equation 2 become $$\phi = 2\pi\left(\frac{L \cdot A}{\lambda} - f\tau\right) \quad (3)$$

where θx, θy, and f can be found through standard minimization procedures.

Figure 2:
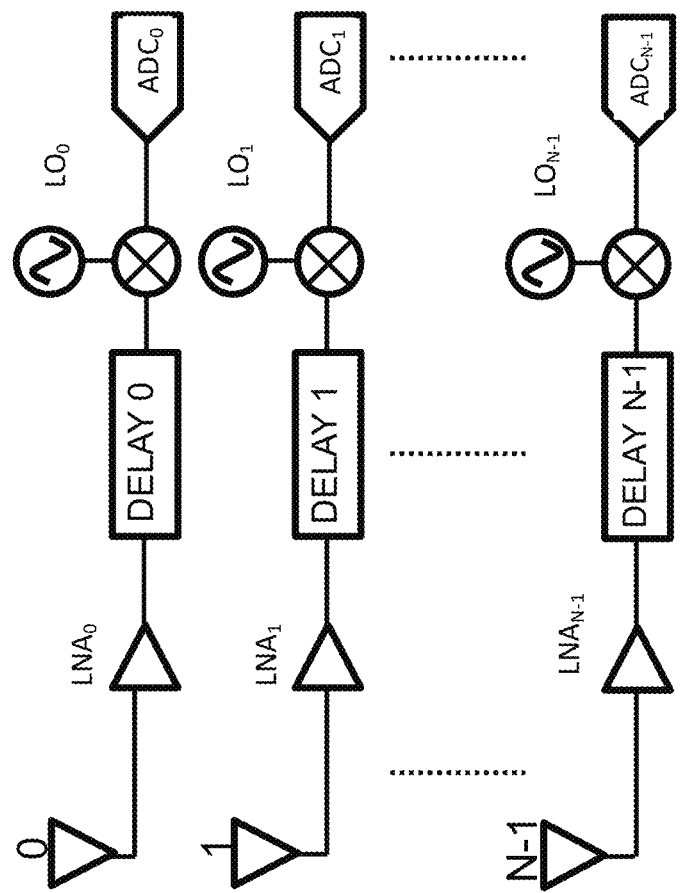
FIG. 2 is a circuit diagram illustrating a sub-Nyquist broadband time-delayed phased array system, according to an embodiment of the present invention.

FIG. 2 is a circuit diagram illustrating a sub-Nyquist broadband time-delayed phased array system 200, according to an embodiment of the present invention. In some embodiments, signals 0 . . . N−1 are generally weak, and therefore, LNAs may be used to boost the signals. For example, antenna signals 0 . . . N−1 are amplified by way of low-noise amplifiers $LNA_1$ . . . $LNA_N$.

Depending on the embodiments, signals 0 . . . N−1 are delayed by inserting the true time delay. The true time delay may be inserted by way of cabling, monolithic microwave integrated circuits (MMICs), or microelectromechanical systems (MEMs), for example. The insertion of the true time delays may cause the phase for each signal 0 . . . N−1 to be different. See, for example, FIG. 1. In an embodiment, the true time delays are randomly selected to deconvolve the frequency from the AOA.

Each delayed signal 0 . . . N−1 is then mixed with corresponding local oscillator $LO_1$ . . . $LO_N$ into a range that is acceptable to analog to digital converters $ADC_1$ . . . $ADC_N$. In some embodiments, this range is broader than the Nyquist sampling rate of $ADC_1$ . . . $ADC_N$. This way, $ADC_1$ . . . $ADC_N$ may alias the signal in a band at least as wide as the antenna.

Figure 3:
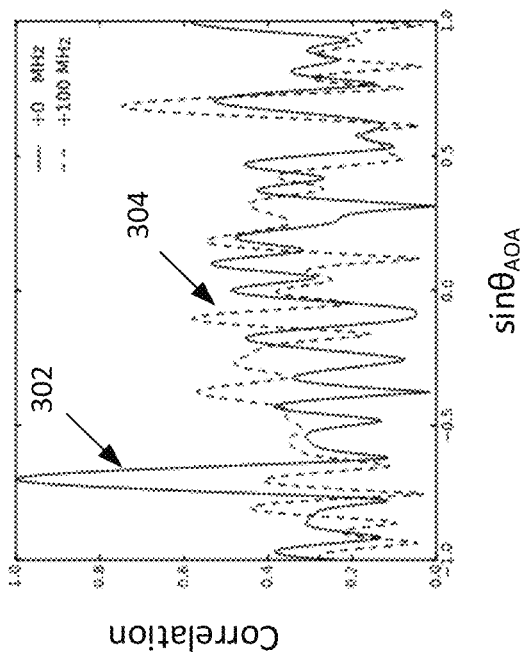
FIG. 3 is a graph illustrating an ambiguity pattern for a time-delayed linear phased array, according to an embodiment of the present invention.

FIG. 3 is a graph 300 illustrating an ambiguity pattern for a time-delayed linear phased array, according to an embodiment of the present invention. In this embodiment, solid curve 302 correlates against the true frequency of 10.3 GHz, while the dashed curve 304 correlates against a frequency of 100 MHz above the true frequency of 10.4 GHz. The shifted frequency may alias down to the same frequency, and therefore, have the same pattern if the time delays were all set to 0. In graph 300, the antenna pattern is distinctly different for the aliased shifted signal.

Figure 4:
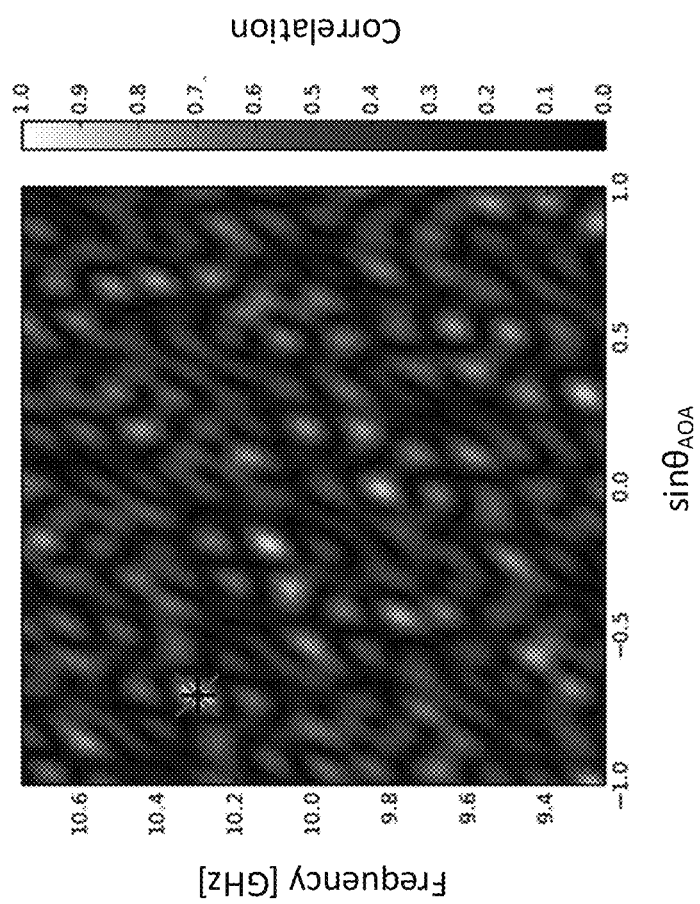
FIG. 4 is a graph illustrating a correlation pattern as a function of AOA and frequency, according to an embodiment of the present invention.

FIG. 4 is a graph 400 illustrating a correlation pattern as a function of AOA and frequency, according to an embodiment of the present invention. The true frequency and AOA is represented by the X. The maximum of the correlation function is the dot on top of the X.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
 a phased array configured to monitor a broad bandwidth with low rate analog to digital converters (ADC) achieving sub-Nyquist rate sampling with 100 percent duty cycle, wherein
 the phased array comprises a plurality of phased array elements, and
 each of the phased array elements are inserted with a non-uniform true time delay to produce a delayed signal for each of the phase array elements, wherein the non-uniform true time delay is not uniform in reference with other non-uniform true time delays, and causes each of the phased array elements to have a different time offset from one another, and
 each delayed signal enables simultaneous measurement of an angle of arrival (AOA) and a frequency of an incident radio frequency (RF) signal.

2. The apparatus of claim 1, wherein each of the non-uniform true time delays are randomly chosen.

3. The apparatus of claim 1, wherein each of the non-uniform true time delays are chosen orthogonal to the set of phases produced by all AOAs.

4. The apparatus of claim 1, wherein each of the non-uniform true time delays cause a pattern of phase differences to depend on the AOA and incident frequency.

5. The apparatus of claim 1, wherein each of the true time delays are inserted by way of cabling, monolithic microwave circuits, or microelectromechanical systems.

6. The apparatus of claim 1, wherein each delayed signal is mixed with a corresponding local oscillator to transform each delayed signal into a range acceptable by a corresponding ADC.

7. The apparatus of claim 6, wherein each ADC is configured to alias a corresponding delayed, acceptable signal in a band at least as wide as an antenna.

8. The apparatus of claim 1, wherein each of the phased array elements are arranged in a linear arrangement with randomly selected spacings and delays.

9. The apparatus of claim 1, wherein each of the phased array elements are arranged in a 2-dimensional arrangement to measure one or more AOAs in an X and Y direction simultaneously with frequency.

10. A phased array for monitoring a broad bandwidth, comprising:
 a plurality of low noise amplifiers configured to amplify a signal, wherein
 the amplified signal from each of the plurality of low noise amplifiers are delayed by inserting a non-uniform true time delay, the insertion of the non-uniform true time delays within each amplified signal enables simultaneous measurement of an angle of arrival (AOA) and a frequency of an incident radio frequency (RF) signal, and
 the non-uniform true time delay is not uniform in reference with other non-uniform true time delays, and causes each of the phased array elements to have a different time offset from one another.

11. The phased array of claim 10, wherein each of the non-uniform true time delays are randomly chosen.

12. The phased array of claim 10, wherein each of the non-uniform true time delays are chosen orthogonal to the set of phases produced by all AOAs.

13. The phased array of claim 10, wherein each of the non-uniform true time delays cause a pattern of phase differences to depend on the AOA and incident frequency.

14. The phased array of claim 10, wherein each of the true time delays are inserted by way of cabling, monolithic microwave circuits, or microelectromechanical systems.

15. The phased array of claim 10, wherein each delayed signal is mixed with a corresponding local oscillator to transform each delayed signal into a range acceptable by a corresponding analog to digital converter (ADC).

16. The phased array of claim 15, wherein each ADC is configured to alias a corresponding delayed, acceptable signal in a band at least as wide as an antenna.

17. The phased array of claim 10, wherein each of the plurality of low noise amplifiers are arranged in a linear arrangement with randomly selected spacings and delays.

18. The phased array of claim 10, wherein each of the plurality of low noise amplifiers are arranged in a 2-dimensional arrangement to measure one or more AOAs in an X and Y direction simultaneously with frequency.

19. A phased array for monitoring broad bandwidth, comprising:
 an n-element phased array with randomly chosen spacings and delays with a predefined center frequency and a bandwidth within than the predefined center frequency, wherein
 the delays are added to create a phase for each element in the n-element phased array, enabling simultaneous measurement of an angle of arrival (AOA) and a frequency of an incident radio frequency (RF) signal, and
 each delay causes each element to have a different time offset from one another.

20. The phased array of claim 19, wherein each element in the n-element phased array is arranged in a linear arrangement with randomly selected spacings and delays.

21. The phased array of claim 19, wherein each element in the n-element phased array is arranged in a 2-dimensional arrangement to measure one or more AOAs in an X and Y direction simultaneously with frequency.

* * * * *